UNITED STATES PATENT OFFICE.

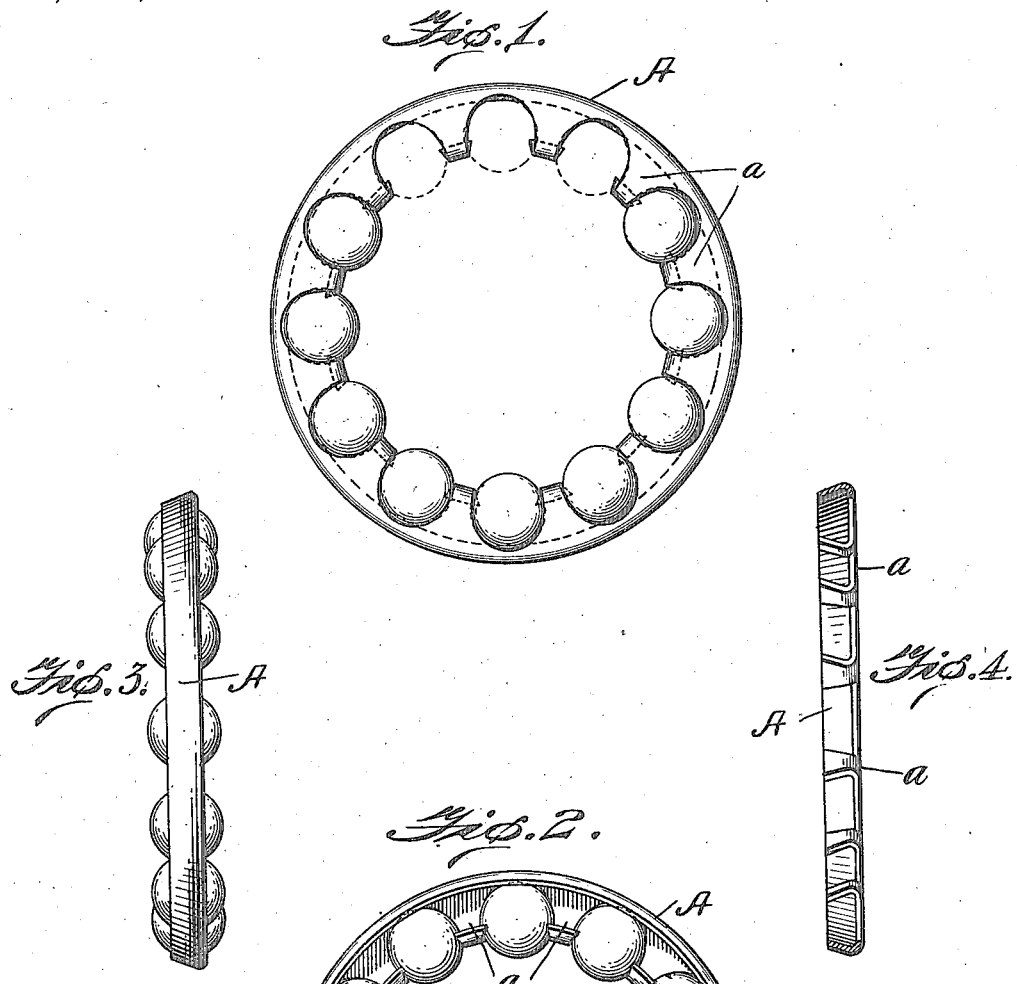

JACKSON L. STRAUB, OF LANCASTER, PENNSYLVANIA, ASSIGNOR TO THE BEARINGS COMPANY OF AMERICA, OF LANCASTER, PENNSYLVANIA, A CORPORATION OF NEW JERSEY.

BALL RETAINER AND SEPARATOR FOR THRUST-BEARINGS.

1,187,673.

Specification of Letters Patent. Patented June 20, 1916.

Application filed November 26, 1915. Serial No. 63,637.

*To all whom it may concern:*

Be it known that I, JACKSON L. STRAUB, a citizen of the United States, residing at Lancaster, in the county of Lancaster and State of Pennsylvania, have invented certain new and useful Improvements in Ball Retainers and Separators for Thrust-Bearings; and I do hereby declare the following to be a full, clear, and exact description of the invention, such as will enable others skilled in the art to which it appertains to make and use the same.

This invention relates to ball retainers for ball bearings, and more particularly to a ball retaining and separating device for thrust bearings.

The object of the invention is to provide a simple, efficient and inexpensive ball retainer and separator for thrust bearings which will accommodate a larger shaft than thrust ball retainers as ordinarily constructed, and which will allow the shaft to come into contact with the balls if necessary or desired.

The invention will first be hereinafter more particularly described, with reference to the accompanying drawings, which form a part of this specification, and then pointed out in the claims at the end of the description.

Figure 1 of said drawings represents a side elevation of a ball separating and retaining device embodying my invention; the same being partly filled with balls; Fig. 2 is a similar view looking at the opposite side of said device; Fig. 3 is an end elevation of the same; and Fig. 4 a vertical sectional elevation thereof.

Referring to said drawings, in which the same reference letters are used to denote corresponding parts in different views, the letter A may denote a ring-shaped body which is substantially flat and inclined toward one edge while the other edge thereof has formed integrally therewith a series of radial inwardly extending flanges $a$, which taper from their bases or junction with said ring-shaped body to near their free ends, which are slightly inclined or flaring toward their extremities and are bent at an acute angle to the main portions of said flanges, inclining toward the inwardly inclined edge of the overlying ring A, so as to provide between adjacent flanges a series of approximately semi-circular openings or pockets into which, by reason of the resiliency of said flanges, may be sprung a series of balls, which are confined in said openings or pockets by contact at one side thereof with the ends of said flanges and the inwardly inclined edge of the ring A, and at the other side thereof with the margins of the flanges and the overlying ring bounding said semicircular openings, whereby the series of balls will be effectually retained in said spaces and held in separated relation when the retainer and separator is removed from the bearings.

It will be observed that the balls project from their pockets in opposite directions clear of both sides of the ring, as more clearly shown in Fig. 3, and also inwardly beyond the extremities of the radial flanges, allowing the shaft to come in contact with the balls if necessary or desired.

I thus provide a ball retainer and separator for thrust bearings, more particularly an end thrust bearing, which will accommodate a larger shaft than the average or ordinary thrust ball retainer, and which is so constructed that the balls will contact with the bearing surfaces on opposite sides of the retainer without liability of contact between such bearing surfaces and the ball retaining and separating device.

The device is also very simple in construction and may be readily stamped out of sheet metal and bent into proper shape at a very small cost.

Having thus described my invention, what I claim as new and desire to secure by Letters Patent is:

1. A ball retaining and separating device for thrust bearings comprising a substantially flat ring inclined inwardly toward one edge thereof, and having a series of radial inwardly extending tapering flanges springing from the opposite edge thereof; said flanges being bent near their free ends toward the inwardly inclined edge of said ring, so as to provide between adjacent flanges a series of openings or pockets adapted to receive and confine therein a series of balls protruding therefrom in three directions, substantially as described.

2. A ball retaining and separating device for end thrust bearings comprising a substantially flat ring inclined inwardly toward one edge thereof, and having integral therewith a series of radial inwardly extending tapering flanges springing from the opposite edge thereof; said flanges being bent near their free ends toward the inwardly inclined edge of said ring, at an acute angle to the main portions of the flanges, so as to provide between adjacent flanges a series of openings or pockets adapted to receive and confine therein a series of balls protruding therefrom in three directions, substantially as described.

In testimony whereof I affix my signature in the presence of two witnesses.

JACKSON L. STRAUB.

Witnesses:
W. A. FULMER,
A. G. HERTZLER.